Patented Oct. 12, 1926.

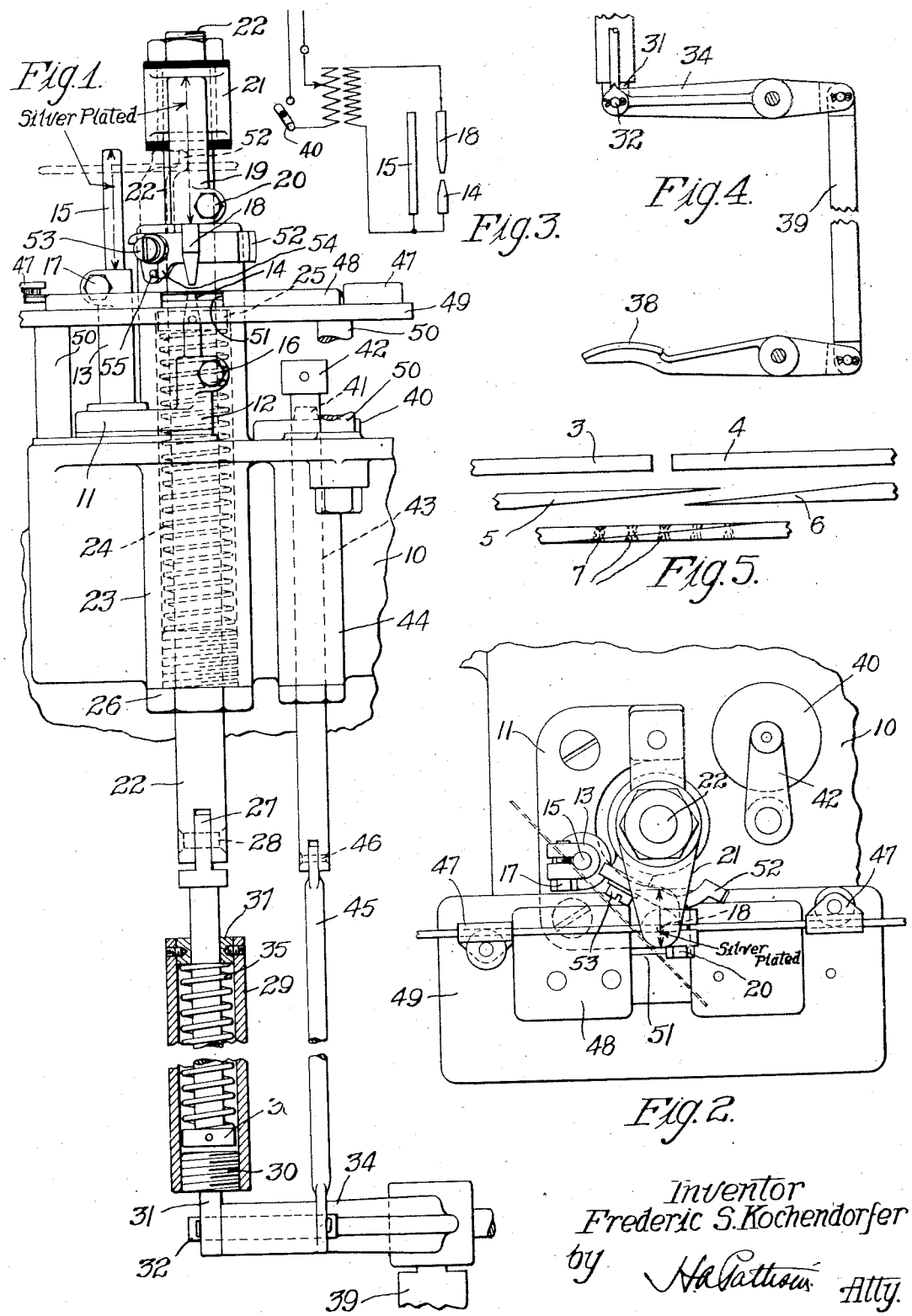

1,602,682

UNITED STATES PATENT OFFICE.

FREDERIC SHIELDS KOCHENDORFER, OF RIVER FOREST, ILLINOIS, ASSIGNOR TO WESTERN ELECTRIC COMPANY, INCORPORATED, OF NEW YORK, N. Y., A CORPORATION OF NEW YORK.

APPARATUS FOR WELDING AND ANNEALING METAL PARTS.

Application filed August 31, 1922. Serial No. 585,559.

Apparatus made in accordance with this invention are particularly well adapted for welding together the ends of metallic tapes of the type used with the taping machine disclosed in Patent 1,565,652, issued December 15, 1925, and then annealing the welded joint to give it a tensile strength and ductility equal to that of the rest of the tape. However, the apparatus is not limited to this use, but is adapted to weld and anneal various metal parts, and it is to be understood that the spirit and scope of the invention is limited only by the appended claims.

An object of the invention is to provide an electric welding and annealing apparatus which is simple in construction, embodying a small number of parts, which may be operated rapidly, and has an electric circuit that is characterized by its simplicity.

To attain this object, an apparatus made in accordance with the invention comprises a fixed electrode and a movable electrode together with a source of current and switch mechanism for closing the circuit through the electrodes. In the type of apparatus shown, these electrodes are particularly designed for spot welding, but it is to be understood that they may be modified to perform butt welding, lap welding, or other well known welding operations. A third electrode is connected in multiple with one of the series electrodes and when the welding operation is completed, the metal at each side of the weld may be held against this third electrode and the other series electrode and the switch mechanism actuated to close the circuit, whereby the metal in the welded portion is heated to an annealing temperature. The electrodes and switch mechanism are so designed that the same switch mechanism is actuated in the same manner for both the welding and annealing operations.

Other objects and advantages of the invention will more fully appear in the following description and are particularly pointed out in the appended claims.

In the accompanying drawings which illustrate one embodiment of the invention:

Fig. 1 is a fragmentary front elevation partly in section of a welding and annealing apparatus made in accordance with the present invention;

Fig. 2 is a top plan view of the apparatus shown in Fig. 1;

Fig. 3 is a diagrammatic illustration of the electric circuit employed with the apparatus;

Fig. 4 is a fragmentary side elevation showing the foot treadle and its connections for operating the movable electrode and actuating the switch mechanism;

Fig. 5 is a diagrammatic illustration showing metal tapes before and after the welding operation.

Referring now to the drawings in detail in which like reference numerals designate similar parts, 10 represents a suitable base or the framework of the machine to which the welding and annealing apparatus may be attached. Fastened to the base 10 is a U-shaped plate 11 having integral therewith vertically disposed tubular portions 12 and 13, and adjustably mounted therein are fixed electrodes 14 and 15 respectively, the tubular portions being split adjacent their upper ends and clamped against the electrodes, to hold them in their adjusted positions, by means of screws 16 and 17 respectively. The tubular portion 13 and the electrode 15 are disposed at one side and project considerably above the tubular portion 12 and electrode 14, the purpose of which will be hereinafter described.

Co-operating with the fixed electrode 14 and mounted directly above it is a movable electrode 18. This electrode is adjustably mounted within a tubular portion 19 and is held in its adjusted position by means of a screw 20 which clamps a split end of the portion 19 against the electrode. The portion 19 is integral with an arm 21 which is fastened to the upper end of a reciprocable rod 22 but electrically insulated therefrom. This rod is mounted within a tubular boss 23 integral with the base 10 and is held in a normally elevated position in which the electrode 18 is out of contact with the electrode 14, as is shown in Fig 1. The rod 22 is held normally elevated by means of a compression spring 24, the spring bearing at one end against a collar 25 pinned to the shaft and at its other end against the inner end of a tubular plug 26 screwed within the lower end of the portion 23. The lower end of the rod 22 is bifurcated to receive one end of a link 27 which is pivoted thereto by a pin 28. The link 27 is mounted within a tube 29 into the lower end of which a plug 30 is screwed, the plug having integral therewith an arm 31 which is pivotally mounted upon a shaft 32 carried by one end of an arm 34 (Fig. 4). Surrounding the link 27 is a compression spring 35 which bears at one end against a collar 36 pinned to the link and at its other end against a tubular plug 37 fastened in the upper end of the tube 29. The spring 35 is stronger than the spring 24 and when the arm 34 is moved downwardly, by means hereinafter to be described, the spring 24 is compressed, while the spring 35 forms a relatively fixed connection between the link 28 and the tube 29.

To move the electrode 18 into contact with the work between it and the fixed electrode 14, a foot pedal 38 (Fig. 4) is depressed which through a link 39 rocks the lever 34 counter-clockwise, drawing the link 27 and rod 22 downwardly, causing a downward movement of the electrode 18.

The electrodes 14 and 18 are adapted to perform spot welding in a manner well known to those skilled in the art. After the electrodes have come in contact with the parts to be welded, a switch is closed, serving to connect them with a source of electrical current which serves to produce a flow of heating current through the metal parts substantially localized therein so as to bring it to the welding temperature at a desired spot, pressure being applied between the electrodes by the foot lever 38.

The electrical circuit is diagrammatically illustrated in Fig. 3, the electrode 14 being connected with one terminal of the secondary winding of a transformer, while the electrode 18 is connected with the other side of the secondary winding. The heat for welding and for annealing may be controlled by a rheostat (not shown) in the primary circuit. It will usually be found that the setting for welding will be saitsfactory for annealing. After the electrode 18 has been moved downwardly so as to press the metal parts between it and the electrode 14, as previously described, the switch 40 is moved to close the circuit. The switch 40 is illustrated as being a push button switch of any suitable type, and mounted on the base 10. Positioned directly above the push button 41 of the switch is an arm 42 which is fastened upon the upper end of a rod 43 reciprocably mounted within a tubular boss 44 integral with the base 10. The lower end of the rod 43 is bifurcated to receive the upper end of a link 45 which is pivoted thereto by a pin 46. The lower end of the link 45 is pivotally connected to the shaft 32, and when the foot pedal 38 is depressed to lower the rod 22, the rod 43 is simultaneously moved downward, causing the closure of the switch 40. From this it will be seen that the foot pedal 38 is a common actuating element for moving the electrode 18, and for closing the switch 40.

When this apparatus is used for welding the metallic tapes used with the taping machine disclosed in the previously mentioned patent, the ends of the two tapes which are to be welded are first ground on lines diagonal to their faces so as to have the shape illustrated at 5 and 6 in Fig. 5, which illustrates fragments of the tapes in side elevation. The tapes previous to the grinding operation are illustrated at 3 and 4. When the tapes are ground as above described, they may be fitted together so that the cross-sectional dimension of the joint will not be larger than the cross sectional dimension of the rest of the tape. The tapes may be ground by grinding apparatus disclosed in co-pending application, Serial No. 585,373, filed August 31, 1922, and in this machine the tapes are partially supported during the grinding operation by means of suitable clamps 47. When the tapes ground by this apparatus are to be welded by the mechanism herein described, the two ends of the tape having attached thereto the clamps 47 are placed on a jig 48 which is supported on a table 49 carried by suitable standards 50 attached to the base 10. The clamps 47 are placed adjacent the outside edges of the jig, the ends of the tapes projecting over an opening 51 made in the jig and overlapping each other for a slight distance. The overlapping portions of the tapes rest upon the fixed electrode 14 which projects through a suitable opening formed in the table 49. After the overlapping portions of the tapes are welded at one spot, the jig 48 is moved to the left or right and the tape again welded. Any desired number of spot welds are made through the joint as may be deemed necessary to secure the requisite union between the tapes, a plurality of such welds being shown at 7 in Fig. 5.

After the spot welding operation is completed it is desirable in many instances, and especially in the case of the metallic tapes above referred to, to anneal the welded joint so that it may have the same tensile strength and ductility as the remainder of the tapes. To anneal the tapes, a trigger 52 is raised so that its free end rests beneath the arm 21, as is shown in dotted lines in Fig. 1. The trigger 52 is pivotally mounted upon a stud 53 carried by the boss 11 and normally rests in the position shown in full lines in Fig. 1 in which a tail 54 formed on the trigger rests in engagement with a stationary pin 55.

After the trigger 52 has been raised as above described, the clamps 47 are removed and the tapes at each side of the welded portion are held against the holder 21 for the electrode 18 and the electrode 15 in the positions shown in dotted lines in Fig. 2. In order to present a better contact surface, the portions of the electrode 15 and holder 21, with which the tapes contact, are silver plated. The foot treadle 38 is then depressed to close the switch 41. The trigger 52 holds the movable electrode 18 stationary, but the arm 34 is free to move counter-clockwise to lower the rod 44 and link 45 and arm 42 to close the switch, due to the spring connection between the tube 29 and the link 27 which is pivoted to the rod 22. The tube 29 moves downwardly with the link 45, but merely compresses the spring 35 without lowering the link 27 or the rod 22. The closure of the switch 40 connects the movable electrode 18 and its holder with one side of the source of current, the electrode 15 being permanently connected with the other side of the source of current and in multiple with the fixed electrode 14, as clearly shown in Fig. 3.

Although in the apparatus disclosed, the welding electrodes 14 and 18 are designed particularly to perform spot welding, it is to be understood that these electrodes may be modified to perform butt welding, lap welding, etc.

From the above it will be understood that the same switch mechanism serves to establish the proper electrical circuit for both the welding and annealing operations and that the foot treadle 38 is depressed in both instances to operate the switch. This advantageous result is due to the fact that the electrodes 14 and 18 are connected in series and that the electrodes 14 and 15 are connected in multiple, the trigger 52 and lost motion connection between the lever 34 and the rod 22 permitting the operation of the switch 40 to close the circuit for the annealing operation without bringing the welding electrodes 14 and 18 into a circuit closing position.

What is claimed is:

1. In an electric welding and annealing apparatus, a fixed electrode and a movable electrode in series with each other, and a third fixed electrode in multiple with one of said first-mentioned electrodes.

2. In an electric welding and annealing apparatus, a fixed electrode and a movable electrode in series with each other, and a third fixed electrode in multiple with said first-mentioned fixed electrode.

3. In an electric welding and annealing apparatus, a fixed electrode and a movable electrode in series with each other and a third electrode in multiple with one of said first-mentioned electrodes, a source of current, a swich device for connecting the electrodes with the source of current, means for moving said movable electrode, and operating mechanism for said switch device connected with said means.

4. In an electric welding and annealing apparatus, a fixed electrode and a movable electrode in series with each other, a third electrode in multiple with one of said first-mentioned electrodes, a source of current, a switch device for connecting said source of current with said electrodes, common means for operating said movable electrode and actuating said switch device, means for holding said movable electrode stationary and said common operating means designed whereby said switch device may be actuated when said movable electrode is held stationary.

5. In an electric welding and annealing apparatus, a fixed electrode and a movable electrode in series with each other, a third electrode in multiple with one of said first-mentioned electrodes, a source of current, a switch device for connecting said source of current with said electrodes, an operating element, a lost motion connection between said operating element and said movable electrode, and a fixed connection between said operating element and said switch device.

6. In an electric welding and annealing apparatus, a fixed electrode and a movable electrode in series with each other, a third electrode in multiple with one of said first-mentioned electrodes, a source of current, a switch device for connecting said source of current with said electrodes, an operating element, a lost motion connection beween said operating element and said movable electrode, a fixed connection between said operating element and said switch device, and means operable to hold said movable electrode stationary during the operation of said operating element.

7. In an electric welding and annealing apparatus, a pair of electrodes arranged in opposed relationship to each other to weld and another electrode disposed at one side of said first mentioned electrodes and designed to cooperate with one of said other electrodes to anneal the welded portion.

8. In an electric welding and annealing apparatus, a fixed electrode and a movable electrode arranged in opposed relationship to each other to weld, and a third electrode adjacent to the first mentioned electrodes in position outside of the path of movement of said movable electrode and designed to cooperate with one of said other electrodes to anneal the welded portion.

9. In an electric welding and annealing apparatus, a pair of spot welding electrodes and another electrode arranged adjacent to said spot welding electrodes and adapted to cooperate with one of said spot welding electrodes.

10. In an electric welding and annealing apparatus, a pair of spot welding electrodes, one of said electrodes being fixed and the other movable, and a third electrode positioned adjacent to said spot welding electrodes and adapted to cooperate with the fixed spot welding electrode.

11. In an electric welding and annealing apparatus, a pair of spot welding electrodes and a third electrode adapted to cooperate with one of said spot welding electrodes and common circuit connections for said electrodes.

12. In an electric welding and annealing apparatus, a plurality of electrodes including a movable electrode, means for bringing the movable electrode into a welding position, and a lost motion connection between said last mentioned means and said movable electrode.

13. In an electric welding and annealing apparatus, a plurality of electrodes including a movable electrode, means for bringing the movable electrode into a welding position and means for rendering said last mentioned means ineffective.

14. In an electric welding and annealing apparatus, a plurality of electrodes including a movable electrode, a source of electrical current, a switch for connecting said movable electrodes with said source of electrical current, common means for bringing the movable electrode into a welding position and for operating said switch, and means for rendering said last mentioned means ineffective with respect to said movable electrode.

15. In electrical welding and annealing apparatus, a plurality of electrodes, one of which is treated to have a surface of low resistivity.

16. In an electric welding and annealing apparatus, a plurality of electrodes arranged in series, a third fixed electrode in multiple with one of said first mentioned electrodes, and adjustable means for mounting said electrodes.

In witness whereof, I hereunto subscribe my name this 26th day of August A. D., 1922.

FREDERIC SHIELDS KOCHENDORFER.